United States Patent [19]
Yaniv et al.

[11] Patent Number: 6,126,194
[45] Date of Patent: *Oct. 3, 2000

[54] INFLATABLE TUBULAR TORSO RESTRAINT SYSTEM

[75] Inventors: Gershon Yaniv, Scottsdale, Ariz.; David J. Romeo, Etna, Wyo.; Gregory B. Grace, Mesa, Ariz.; Nathan R. Butters, Tempe, Ariz.; Marvin K. Richards, Gilbert, Ariz.

[73] Assignee: Simula, Inc., Phoeniz, Ariz.

[*] Notice: This patent is subject to a terminal disclaimer.

[21] Appl. No.: 09/169,302

[22] Filed: Oct. 9, 1998

Related U.S. Application Data

[63] Continuation-in-part of application No. 08/829,750, Mar. 31, 1997.

[51] Int. Cl.⁷ .................................................. B60R 21/18
[52] U.S. Cl. ...................... 280/733; 280/808; 280/728.1; 280/743.1
[58] Field of Search .................................. 280/733, 808, 280/728.1, 743.1

[56] References Cited

U.S. PATENT DOCUMENTS

| | | |
|---|---|---|
| 2,834,606 | 5/1958 | Bertrand . |
| 3,040,383 | 6/1962 | Nassimbene . |

FOREIGN PATENT DOCUMENTS

| | | |
|---|---|---|
| 2442058 | 6/1980 | France . |
| 2606719 | 5/1988 | France . |
| 2675098 | 10/1992 | France . |
| 38 20 145 A1 | 1/1990 | Germany . |
| 92 11 423 U | 8/1992 | Germany . |
| 42 38 427 A1 | 5/1993 | Germany . |
| 43 07 175 A1 | 9/1993 | Germany . |
| 295 17 953 U1 | 2/1996 | Germany . |
| 1-156155 | 6/1989 | Japan . |
| 2-237-837 | 9/1990 | Japan . |
| 3-92451 | 4/1991 | Japan . |
| 3-276844 | 12/1991 | Japan . |
| 5-193430 | 8/1993 | Japan . |
| 5-208653 | 8/1993 | Japan . |

(List continued on next page.)

OTHER PUBLICATIONS

Popular Science, "side Protection Coming?," Dec. 1993.
Arizona Republic Newspaper, "Car Air Bags for Side Hits in the Works," Mar., 1994.
Aviation Week and Space Technology, "Army Develops Crew Restraint System," vol. 120, No. 3, Jan. 16, 1984, New York, USA, p. 187.
Japanese Patent Abstract No. 111 vol. 16 of Patent No. A–3 281 455 to Hideki, published on Dec. 12, 1991.
Livbag product brochure, "Specifications for Euroflator Gas Generator and Safety Data Sheet," Aug., 1992.

*Primary Examiner*—Paul N. Dickson
*Assistant Examiner*—Deanna Draper
*Attorney, Agent, or Firm*—Shaw Pittman

[57] ABSTRACT

A seat restraint system whose torso belt includes an inflatable structure that inflates upon impact to protect the occupants of a vehicle such as an automobile. The inflatable structure is linked to a gas generator and crash sensor. When an impact above a predetermined level of severity is detected, the gas generator is ignited, inflating the inflatable structure which contracts in length as it inflates. In a preferred embodiment, the inflatable structure is a braided tube. As the braided tube inflates, the diameter of the tube increases significantly and its length decreases significantly, due to the orientation of the fibers comprising the braided tube. The contraction in length pretensions the seat belt system by pulling any slack out of the seat belt systems. In a frontal impact, the inflated structure restricts the forward motion of an occupant and distributes crash loads over a larger occupant surface area to reduce both primary and secondary injuries. In a side impact, the inflated structure passes over the occupant's shoulder, restricts occupant motion, distributes crash loads and provides head and neck protection.

49 Claims, 15 Drawing Sheets

U.S. PATENT DOCUMENTS

| | | |
|---|---|---|
| 3,316,337 | 4/1967 | North . |
| 3,642,303 | 2/1972 | Irish et al. . |
| 3,682,498 | 8/1972 | Rutzki . |
| 3,687,485 | 8/1972 | Campbell . |
| 3,730,551 | 5/1973 | Sack et al. . |
| 3,784,223 | 1/1974 | Hass et al. . |
| 3,792,873 | 2/1974 | Buchner et al. . |
| 3,807,754 | 4/1974 | Rodenbach et al. . |
| 3,841,654 | 10/1974 | Lewis ........................................ 280/733 |
| 3,844,581 | 10/1974 | Fox . |
| 3,866,940 | 2/1975 | Lewis ........................................ 280/733 |
| 3,888,503 | 6/1975 | Hamilton ................................. 280/733 |
| 3,888,504 | 6/1975 | Bonn et al. . |
| 3,892,425 | 7/1975 | Sakairi et al. . |
| 3,905,615 | 9/1975 | Schulman . |
| 3,929,205 | 12/1975 | Takada et al. . |
| 3,948,541 | 4/1976 | Schulman . |
| 3,953,049 | 4/1976 | Surace et al. . |
| 3,953,640 | 4/1976 | Takada . |
| 3,970,329 | 7/1976 | Lewis . |
| 4,348,037 | 9/1982 | Law et al. . |
| 4,592,523 | 6/1986 | Herndon . |
| 4,805,930 | 2/1989 | Takada . |
| 4,921,735 | 5/1990 | Bloch . |
| 4,971,354 | 11/1990 | Kim . |
| 5,018,762 | 5/1991 | Suzuki et al. . |
| 5,039,035 | 8/1991 | Fitzpatrick . |
| 5,062,662 | 11/1991 | Cameron . |
| 5,251,931 | 10/1993 | Semechena et al. . |
| 5,282,648 | 2/1994 | Peterson . |
| 5,303,953 | 4/1994 | Kamiyama et al. . |
| 5,312,131 | 5/1994 | Kitagawa et al. . |
| 5,322,322 | 6/1994 | Bark et al. ........................... 280/730.2 |
| 5,346,250 | 9/1994 | Kamiyama ............................. 280/733 |
| 5,354,096 | 10/1994 | Tamiyama et al. . |
| 5,383,713 | 1/1995 | Kamiyama et al. . |
| 5,385,367 | 1/1995 | Tanaka et al. ......................... 280/733 |
| 5,390,953 | 2/1995 | Tanaka et al. . |
| 5,393,091 | 2/1995 | Tanaka et al. ......................... 280/733 |
| 5,445,411 | 8/1995 | Kamiyama et al. . |
| 5,446,003 | 8/1995 | Augustine et al. . |
| 5,464,246 | 11/1995 | Castro et al. . |
| 5,465,999 | 11/1995 | Tanaka et al. . |
| 5,466,002 | 11/1995 | Tanaka et al. . |
| 5,480,181 | 1/1996 | Bark et al. . |
| 5,839,753 | 11/1998 | Yaniv et al. ............................ 280/733 |

FOREIGN PATENT DOCUMENTS

| | | |
|---|---|---|
| 1381999 | 1/1975 | United Kingdom . |
| 2191450 | 12/1987 | United Kingdom . |
| 2261636 | 5/1993 | United Kingdom . |
| 1320475 | 6/1993 | United Kingdom . |
| 2262720 | 6/1993 | United Kingdom . |
| WO90/11914 | 10/1990 | WIPO . |
| WO 9419215 | 9/1993 | WIPO . |

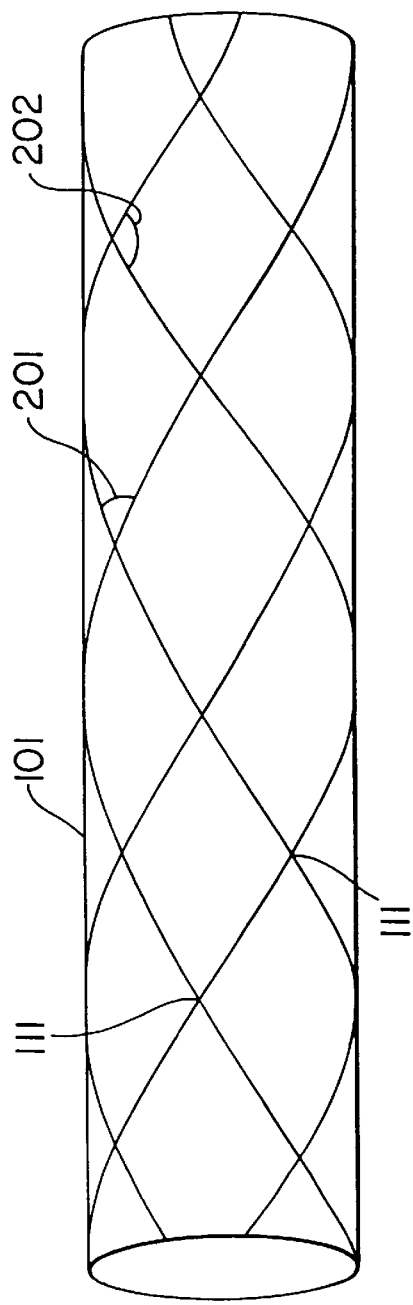
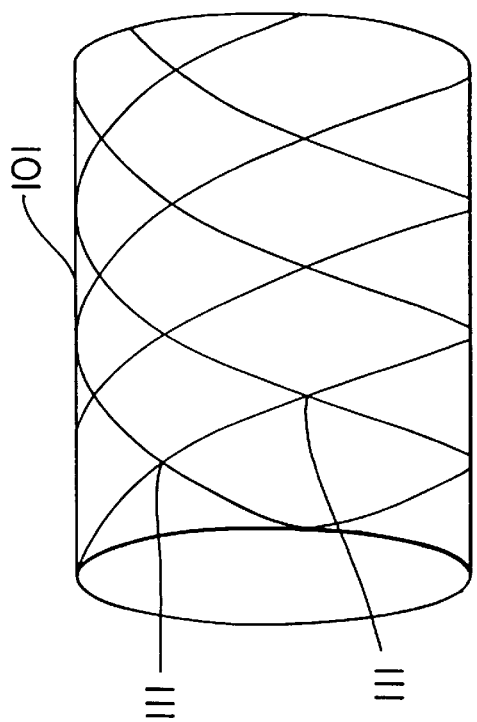
FIG. 2a
FIG. 2b

CONVENTIONAL THREE-POINT SEAT
BELT BASELINE FORWARD IMPACT

AIRBELT-1 FORWARD IMPACT

AIRBEST-2 FORWARD IMPACT

PRESENT INVENTION
FORWARD IMPACT

CONVENTIONAL THREE-POINT
SEAT BELT BASELINE
LATERAL IMPACT

AIRBELT-1 LATERAL IMPACT

AIRBELT-2 LATERAL IMPACT

PRESENT INVENTION
LATERAL IMPACT

INFLATABLE TUBULAR TORSO RESTRAINT SYSTEM

This application is a continuation-in-part application of U.S. application Ser. No. 08/829,750, filed Mar. 31, 1997 (the '750 application), and claims priority from the '750 application, which is incorporated herein by reference.

BACKGROUND

1. Field of the Invention

This invention relates to a system for restraining the body of an occupant in a vehicle to reduce the extent and severity of injuries during a crash. More specifically, the invention relates to a seat belt restraint system which incorporates an inflatable tubular section in the torso section of the belt. The inflatable tubular section can be made of a woven or braided tube of continuous high-strength fibers or can alternatively be made from an extruded net or from a woven net. The restraint system reduces the extent and severity of both primary and secondary injuries to vehicle occupants.

2. Background of the Invention

Conventional seat belts are designed to protect the occupants of vehicles such as automobiles, trucks, vans, airplanes and helicopters from primary injuries during an accident. Primary injuries are injuries caused by the initial impact of the occupants against the interior of the vehicle. However, the protection provided by conventional seat belts against primary injuries may sometimes be inadequate. For example, slack in the seat belts may lead to unnecessarily serious primary injuries. In side impacts conventional belts do not provide occupant head protection on the struck side of the vehicle. Moreover, the seat belts themselves may often be responsible for secondary injuries, since the load from the seat belts is distributed only over small areas of the occupant's body. However, some prior art belts have tried to lessen primary injuries by incorporating an inflating mechanism into the seat belt restraint.

For example, U.S. Pat. No. 5,282,648, which is incorporated by reference herein, discloses an inflatable body and head restraint system, wherein inflatable bladders are attached to the shoulder straps of a harness restraint. The bladders are stowed partially underneath and partially on top of harness straps. This configuration provides stability and prevents the bladders from rolling out of position during inflation. During a crash, the bladders inflate to protect the upper body, primarily the head and neck of the occupant.

Additionally, U.S. Pat. Nos. 3,948,541 and 3,905,615 to Schulman disclose another inflatable body and head restraint system, wherein a bladder is securely affixed to shoulder straps and a lap belt. The bladder has chin, chest, and pelvic bags. Upon impact, the bladder automatically inflates to cushion the pelvic areas and to prevent forward rotation of the head. However, upon inflation the bladder tends to roll out from its position under the shoulder straps. Also, because the bladders are constricted by the harness, portions of the bladder are subjected to high pressures, which can lead to splitting of the bladder.

Simple inflatable body restraints are also disclosed in U.S. Pat. Nos. 3,682,498 and 4,348,037 to W. Rutzki and B. Law et al, respectively. These patents disclose inflatable protective devices that are located in or under the seat harnesses to which they are attached. These inflatable body restraints are subject to roll-out and seam or web splitting problems.

In yet another prior art seat belt disclosed in, U.S. Pat. Nos. 3,841,654 and 3,970,329 both to Lewis, a vehicle seat system which comprises a seat belt having an inflatable section is shown. When a collision is detected, the inflatable section is inflated to protect the person wearing the seat belt.

The prior art inflatable seat belt structures, such as those identified above, generally use a unitary inflatable section made from a tightly woven material, such as 420 denier nylon, which is conventional air bag material. When deployed, the inflatable section will contract in length somewhat because the inflation pressure causes it to go from a flat, generally 2-dimensional shape to a 3-dimensional cylindrical shape. However, only the ends of the inflatable section contract as they fill and assume a hemispherical shape. This causes only the ends of the inflatable section to shorten, thus shortening the overall length of the inflatable section. The fibers of the material do not change their orientation: the two sets of fibers in the material remain roughly perpendicular to each other throughout the inflation process.

In the case of the typical inflatable seat belt made of conventional air bag material as described above, the maximum theoretical amount that the inflatable structure contracts upon inflation, in an unconstrained condition prior to being loaded by the occupant, is based only on the width of the flat material. If inflation results in a relatively small cylindrical diameter then a relatively small contraction, or shortening, of the length of the seat belt will occur. The calculation for determining the amount of contraction that will occur with conventional air bag material upon inflation and in an unconstrained condition is as follows:

$$Lf - Li = X \tag{1}$$

where:

X is the amount of contraction

Lf is the length of flat, uninflated, material

Li is the length of unconstrained inflated material, and $$Li = Lf - (Df - Di) \tag{2}$$

$$Di = 2/\pi \, (Df) \tag{3}$$

$$Lf - Li = Df(1 - 2/\pi) \tag{4}$$

where:

Df is the width (flat diameter) of flat, uninflated, material

Di is the diameter of unconstrained inflated material.

As seen in equation (4), the length reduction depends solely on the uninflated width (flat diameter) of the material.

For example, an inflatable structure having a flat diameter of 20 cm and a flat length of 100 cm has a maximum achievable contraction of 7.3 cm or roughly 7% in the absence of any load. In an actual application, with the belt under tension, the contraction would be much less, e.g., about 3%. This degree of contraction would provide restraint that is only slightly greater, and, thus, only slightly more protective than a conventional seat belt.

The construction disclosed in U.S. Pat. No. 3,888,503 to Hamilton comprises an inflatable restraining band having a series of sections, some of which are inflatable to a greater degree than others interconnecting them. In the Hamilton design, contraction occurs upon inflation only at each end of each section, and because the sections are of variable inflatable size, the amount of contraction varies along the structure. By not allowing full expansion of interconnecting portions or sections of the inflatable band more hemispherical "ends" occur thus the overall band is foreshortened to a greater extent than otherwise on expansion, which causes greater tensioning of the band against the occupant restrained.

Hamilton provides greater protection than the conventional inflatable seat belt in terms of the provision of greater restraint and hence improves upon a conventional inflatable seat belt. However, the restraint that results from Hamilton's patent is still significantly less than the restraint provided by the present invention.

None of the patents described above provide the important advantage of the significant contraction which occurs in the present invention as the inflatable structure expands upon inflation.

SUMMARY OF THE INVENTION

The present invention is a seat restraint system having an inflatable structure in the torso section of the system, connected to a gas generator and crash sensor, that shortens greatly as it inflates. The invention is intended to replace conventional automotive seat belts. It can also be used in other types of vehicles and moving structures, such as trucks, vans, airplanes, railroad trains, elevators and helicopters.

The inflatable structure is a key component of the present invention. The inflatable structure must have the following characteristics: (1) it must contract in length substantially as it is inflated—the decrease in length of the inflated portion of the torso belt (measured when the torso belt is not under tension) must be at least 15%, and should preferably be 20% to 40%; (2) the area of the cross-section of the structure should increase substantially as the tube is inflated—the increase should be at least 50%, preferably 50% to 100%; (3) it must remain at a relative pressure sufficient to maintain a tensile force on the torso belt of 100 lbs (at ~1 g torso mass) for at least five seconds, and preferably at least 7 seconds; (4) the reduction in the length of the structure is the direct result of the inflation of the structure, which also results in an increase in the cross-sectional area of the structure. For example, an inflatable structure which is 91 cm long and has a diameter of 12 cm prior to inflation, reduces its length by about 28 cm and increases its diameter to 17 cm when the structure is inflated (not under tension).

In a first preferred embodiment of the present invention, the inflatable structure is a tubular structure that comprises a braided tube of continuous high-strength fibers (instead of the conventional material used for air bags). The fibers of the braided tube of the present invention form spirals and change their orientation upon inflation. Prior to inflation, the spirals are stretched-out longitudinally and the tubular restraint has a relatively small diameter, as shown in FIG. 2a. Subsequent to inflation, the spirals are closer together longitudinally and form a relatively large tubular diameter, as shown in FIG. 2b. That is, upon inflation, the braided tube significantly increases its diameter and significantly decreases its length. This contraction occurs because when the tube is inflated, the fibers seek an orientation that allows a lower resultant stress and hence a larger volume within the tube. In order to provide superior gas retention, braided tube 221 preferably contains an inner bladder 222, as shown in FIG. 2c.

In the uninflated state, the braided tube in combination with the conventional seat belt assumes a flat woven belt configuration and acts as a conventional seat belt system and holds the occupant in the seat. However, as the braided tube inflates, the decreasing tube length acts as a pretensioning device first by drawing any slack out of the seat belt system and second by pre-loading the occupant. The shortened length of the braided tube helps greatly to further restrict subsequent occupant motion.

The inflated braided tube additionally provides a much larger restraint surface area for the occupant's body, which helps to distribute belt load forces. When the inflated braided tube is loaded by the occupant's body, it flattens slightly. This flattening increases the contact area between the body and the braided tube, thus further reducing the stress or load concentration on the occupant. In a side impact the inflated section provides occupant head protection.

The inflatable braided tube is connected to a gas generator which is in turn connected to a crash sensor. When the crash sensor detects an impact above a predetermined threshold, it sends a signal to the gas generator. The gas generator is ignited, and generating inflating gas that inflates the braided tube. The gas generator can be integrated within the seat back or base, in the buckle assembly of the belt, or in the trunk of the vehicle, for sound damping purposes and/or other practical considerations.

In a second preferred embodiment of the present invention, the inflatable structure comprises an extruded net. An extruded net is likely to be less expensive to manufacture than a braided tube. It can also be manufactured with a more open weave than the braided tube, which could result in greater contraction. FIGS. 4a and 4b are schematic diagrams of an extruded net structure before and after inflation, respectively. The dimensions of FIGS. 4a and 4b show how, as the extruded net is inflated, it contracts in length as it expands in diameter. The extruded net differs from the braid because the intersecting fibers are joined at the intersections. When the extruded net is inflated, the joints deform such that the longitudinal angle of intersection of the fibers increases dramatically, as shown in FIG. 4b. The minimum longitudinal angle prior to inflation is about 5°. Typically, the longitudinal angle prior to inflation is about 10°–15°. It typically increases upon inflation to 90°–110°. The maximum longitudinal angle after inflation can be as high as 150°. This results in the desired inflatable structure, i.e., a structure which contracts substantially in length as it is inflated and the cross-section increases.

An alternative second preferred embodiment uses a modified extruded net, in which the intersections of the fibers are strengthened with nodes, as shown in FIGS. 5a and 5b. Typical materials that could be used to fabricate the modified extruded net include nylon and polyester fibers. The tensile strength of the net at the nodes should be equal to the tensile strength of the fibers.

A third preferred embodiment uses a woven net, as shown in FIGS. 6a and 6b. The woven net is similar to the extruded net, but the joints are woven together instead of being joined together. The joints are reoriented as the inflatable structure is expanded, as shown in FIG. 6b. Typical materials that could be used to fabricate the woven net include nylon, polyester and aramid fibers.

A fourth preferred embodiment, shown in FIG. 2d, uses a protective sheath 223 fabricated from woven fabric, e.g. nylon or polyester fabric, in addition to the braided tube and bladder. The sheath has the appearance and texture of a conventional seat belt.

The present invention may be implemented in the rear seat of an automobile by routing the inflatable section of the torso belt through a constraint at the top of the rear seat and down the back of the rear seat, essentially similar to the front seat installation shown in FIGS. 1a–1e. However, in an alternative embodiment of the present invention, the gas generator is installed behind the rear seat, as, for example, shown in FIG. 7a, and the inflatable section of the torso belt extends across the rear shelf of the vehicle towards the trunk.

In the alternative embodiment shown in FIGS. 7a–7b, the inflatable section of the torso belt is shown as connected to a hose which is connected to a rigid pipe. The rigid pipe is connected to a gas generator, such that the pipe can rotate around the gas generator, without blocking in any way the fluid connection from the gas generator to the rigid pipe, or from the rigid pipe to the hose. The rigid pipe is biased towards the horizontal position.

FIGS. 8a–8c show an embodiment of the present invention for rear seat installation that is similar to that of FIGS. 7a–7b, but uses a hose retractor instead of a rigid pipe. In this embodiment, hose 800 is flexible, and tension is kept on the inflatable structure through the use of torsion springs 801 and rollers 802.

FIG. 9 is a schematic diagram of another embodiment of the present invention, for rear seat installation. This embodiment is similar to the embodiment shown in FIGS. 1a–1e, but uses the space between the seat back and the front trunk wall. The hose is bent into a U shape or J shape, as shown in FIG. 9, and held in place by a channel.

The primary object of the present invention is to prevent or reduce the severity of primary and secondary injuries suffered by a vehicle occupant in the event of a crash, by pretensioning the restraint system, further restricting the motion of the occupant's body, by distributing the restraint forces over a larger surface area, and to provide side impact head protection.

Eight crash tests simulating four equivalent frontal and four equivalent side impacts were conducted to compare the restraining capability of the present invention to a conventional three-point seat belt, and to two prior art air belt systems. The first air belt was inflated to a relative peak inflation pressure of approximately 1 bar, and the second air belt was inflated to a relative peak inflation pressure of approximately 3 bars. The results of these tests are listed in Table 1.

TABLE I

OCCUPANT RESTRAINT TEST RESULTS

FRONTAL IMPACT

|  | 3 pt | Air Belt 1 | Air Belt 2 | Present Invention |
|---|---|---|---|---|
| Displacement (inches) | 20.5 | 18.0 | 14.5 | 5.0 |
| Rotation, (degrees) | 110 | 61 | 42 | 28 |
| HIC | 129 | 406 | 194 | 99 |
| CR, (g's) | 32 | 51 | 27 | 26 |
| Torso belt, (lbs) | 1,466 | 790 | 618 | 500 |
| Lap belt (lbs) | 1,534 | 1,294 | 1,193 | 554 |
| Pressure (psi) | NA | 16.0 | 45.4 | 33.4 |

TABLE I

LATERAL IMPACT

|  | 3 pt | Air Belt 1 | Air Belt 2 | Present Invention |
|---|---|---|---|---|
| Displacement (inches) | 23.0 | 24.0 | 20.5 | 15.3 |
| Rotation (degrees) | 86 | 74 | 15 | 50 |
| HIC | 121 | 126 | 73 | ND |

TABLE I-continued

LATERAL IMPACT

|  | 3 pt | Air Belt 1 | Air Belt 2 | Present Invention |
|---|---|---|---|---|
| CR, (g's) | 53 | 20 | ND | 35 |
| Torso belt (lbs) | 709 | 421 | 410 | 417 |
| Lap belt (lbs) | 595 | 693 | 700 | 383 |
| Pressure (psi) | NA | 17.3 | 40.6 | 31.3 |

As shown by Table 1, the first air belt shows essentially no improvement over the conventional three-point seat belt. The second air belt shows some improvement compared to a conventional three-point seat belt, i.e., head displacement was reduced by six inches in the forward crash simulation and by 2.5 inches in the side impact simulation. Head rotation, a possible indicator of neck injuries, was also reduced. However, the restraint system manufactured according to the present invention, inflated to a peak inflated pressure of approximately 2 bars, produced the greatest improvements in occupant kinematics: head displacement was reduced by 15.5 inches (from 20.5 inches to 5.0 inches) in the forward direction) and by 8 inches (from 23 inches to 15 inches) in the lateral direction. The superior performance of the present invention is due to its ability to reduce its overall length to a greater extent than prior art restraints.

Accordingly, it is an object of the present invention to provide a protective seat belt system that inflates on impact to protect the occupant of a vehicle.

It is another object of the present invention to provide a protective apparatus that restricts occupant motion during a crash.

It is another object of the present invention to provide an inflatable braided tube member that can greatly shorten (by 20% to 40%) as it inflates to remove slack and pretension the restraint system.

It is another object of the present invention to provide an inflatable braided tube that distributes crash loads over larger occupant surface area, thus minimizing pain and potential injury.

It is another object of the present invention to provide an inflatable braided tube that is not subject to roping, roll-out or seam splitting problems.

It is another objective of the present invention to provide an inflatable braided tube that protects the head in side impacts.

These and other objects of the present invention are described in greater detail in the detailed description and the appended drawings.

BRIEF DESCRIPTION OF THE DRAWINGS

FIG. 2a is a schematic diagram of the braided tube of the present invention in the uninflated state.

FIG. 2b is a schematic diagram of the braided tube of the present invention in the inflated state.

DETAILED DESCRIPTION OF PREFERRED EMBODIMENTS OF THE INVENTION

A preferred embodiment of the invention is shown in the uninflated and inflated configurations in FIGS. 1a through 1e installed with respect to a typical driver-side automobile seat 121. A mirror image of the invention would function equally as well on a passenger-side automobile seat.

Figure 1A:
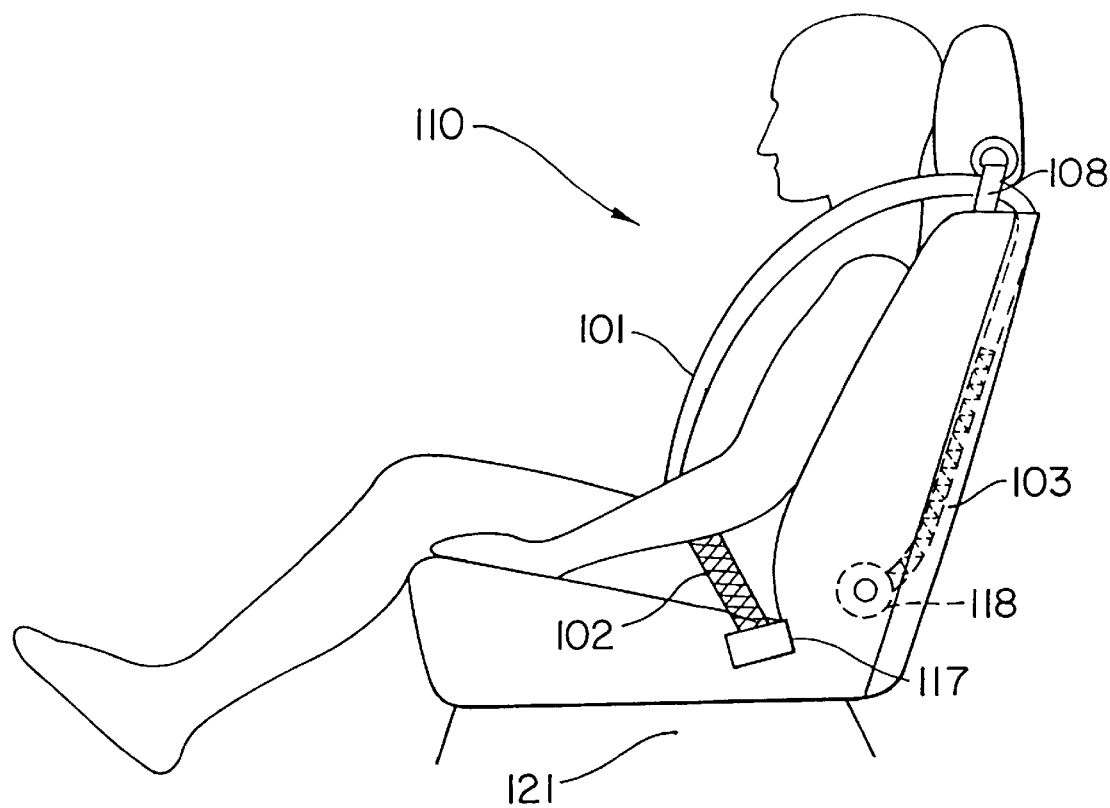
FIG. 1a is a schematic diagram of a side view of the present invention in the uninflated configuration.
Figure 1B:
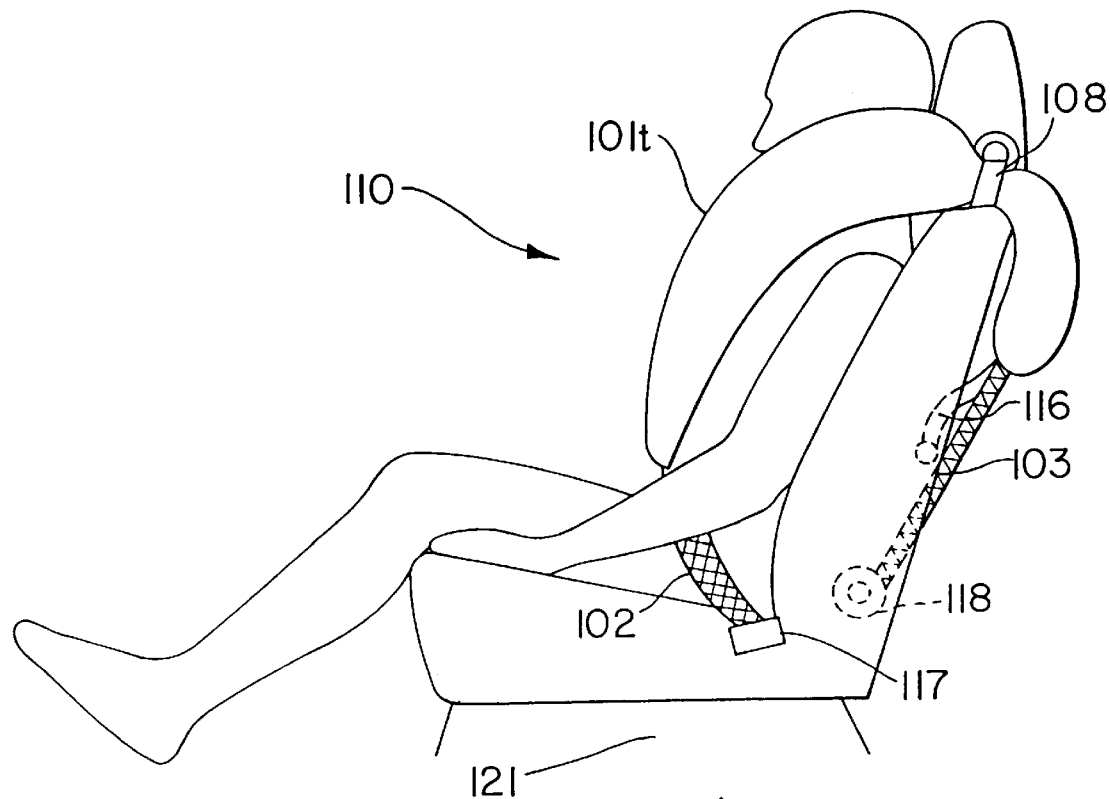
FIG. 1b is a schematic diagram of a side view of the present invention in the inflated configuration.
Figure 1C:
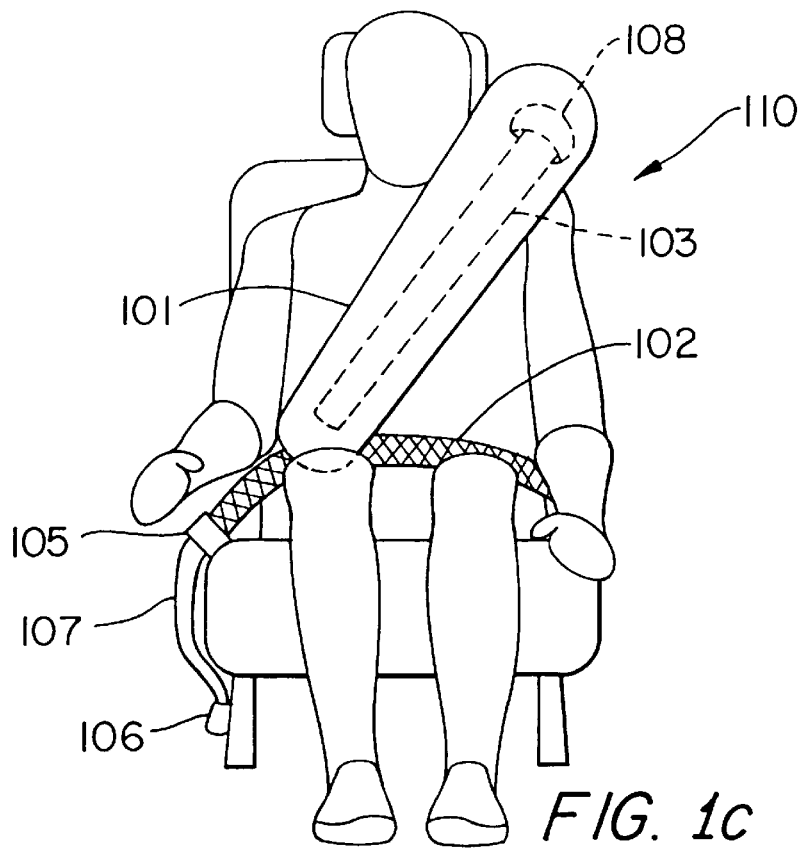
FIG. 1c is a schematic diagram of a front view of the present invention in the inflated configuration installed with respect to the driver-side seat of a typical automobile.

As shown in the FIGS. 1a–1e, the seat belt system 110 of the first preferred embodiment comprises lap belt 102, shoulder or torso belt 103, including an inflatable section 101 comprising a torso portion 101t, buckle assembly 105, anchor 106, anchored inertial reels 117 and 118, gas generator 122, and sensor assembly (not shown). As shown in FIG. 1c, lap belt 102 and torso belt 103 form one continuous strap which is attached to or passes through the male portion of buckle assembly 105. Lap belt 102 is designed to restrict the forward motion of a seated occupant at the pelvis. The lap belt 102 is connected to anchored inertial reel 117 so that the length of the lap belt 102 can be adjusted to accommodate a wide range of seated occupants. Inertial reel 117 pivotally mounts lap belt 102 to the floor or seat structure on the door-side of seat 121 (as shown in FIGS. 1a and 1b). The other end of lap belt 102 ends at the male portion (the tongue) of buckle assembly 105. The male portion (the tongue) may or may not be fixed to the belt (i.e., the tongue is either a fixed tongue or a sliding tongue, depending on the particular locating requirements of the inflatable section which is dependent on the specific application). The female portion of buckle assembly 105 is attached to buckle strap 107. Buckle strap 107 is pivotally mounted to an attachment point in the vehicle, such as the base of seat 121, or a floor structure on the side of seat 121 that is furthest from the door, by anchor 106. The female and male portions of buckle assembly 105 fasten together, thus securing seat belt system 110 around the occupant in a manner similar to that used by conventional three point seat belt systems.

Figure 1D:
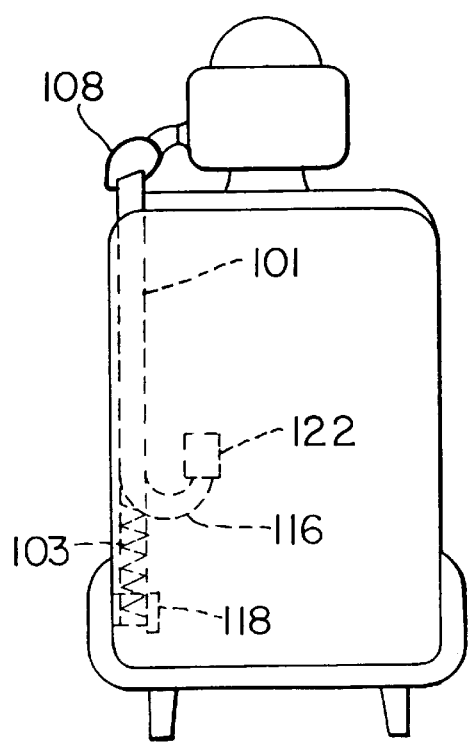
FIG. 1d is a schematic diagram of cut-away rear view of the present invention in the uninflated configuration installed with respect to the driver-side seat of a typical automobile.
Figure 1E:
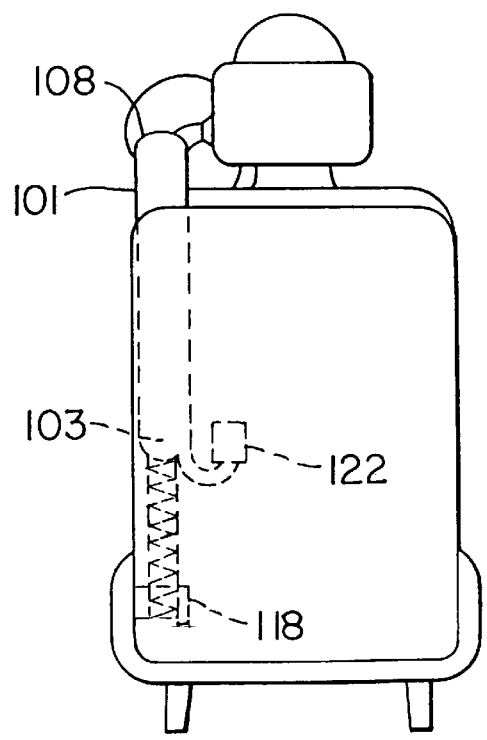
FIG. 1e is a schematic diagram of a cut-away rear view of the present invention in the inflated configuration installed with respect to the driver side seat of a typical automobile.

As shown in FIG. 1d gas generator 122 is preferably mounted inside the seat back to protect it from impacts and to dampen the noise it produces when activated. The gas generator could also be located in the seat base (not shown). Durable tubing 116 provides a fluid path from gas generator 122 to inflatable braided tube 101.

As shown in FIG. 1a, inflatable section 101 extends diagonally from the occupant's hip to behind and above the occupant's shoulder and is attached at each end to torso belt 103. The upper end of inflatable section 101 loops through a D-ring 108 that is mounted to the seat 121 as shown or to the vehicle (e.g., at the roof rail or at the upper B-pillar area (not shown)). The torso belt 103 then is anchored to the seat 121 or vehicle (not shown) by an inertial retractor 118. As shown in FIG. 1a, torso strap 103 is preferably routed inside the vehicle seat to inertial retractor 118, which is mounted in the lower portion of the seat back. As discussed below with reference to FIG. 1d, gas generator 122 is preferably mounted inside the vehicle seat. Thus, in the configuration shown in FIGS. 1a and 1d, tubing 116 provides direct fluid communication from the gas generator to inflatable section 101 in the torso of the restraint system. Torso strap 103, buckle strap 107, and lap belt 102 are formed from conventional webbing material such as nylon, dacron, or polyester. Alternatively strap 107 could be a steel cable.

The key component of the safety belt system 110 is the inflatable structure 101. In the embodiment illustrated in FIGS. 1a–1e, the inflatable structure is a braided tube 101 that is integrated in the torso belt 103. The braided tube 101 is similar to the braided tubes disclosed in U.S. Pat. Nos. 5,322,322 and 5,480,181, which are incorporated by reference herein.

Figure 1F:
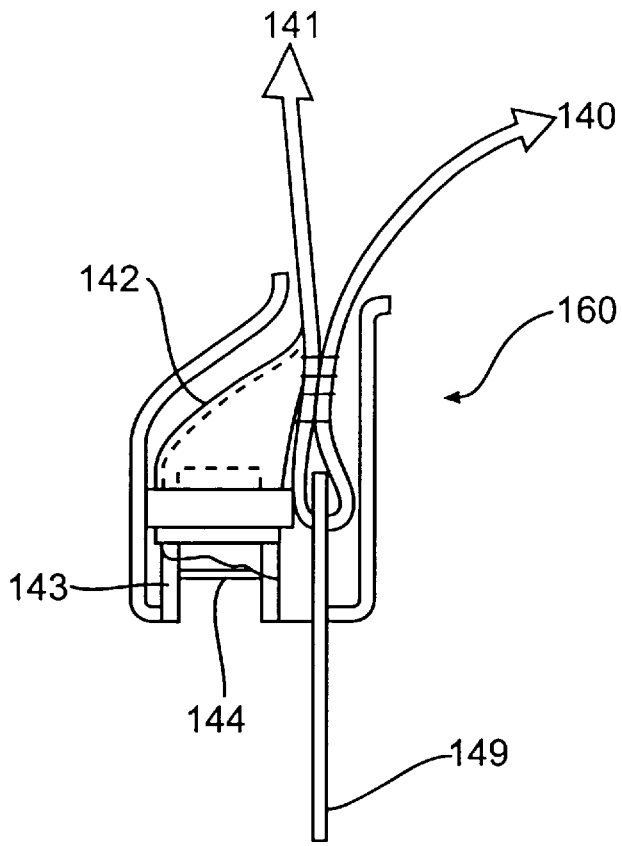
FIGS. 1f and 1g are schematic diagrams of the latch assembly and the buckle assembly, respectively, showing how the gas generator can be mounted in the buckle assembly.
Figure 1G:
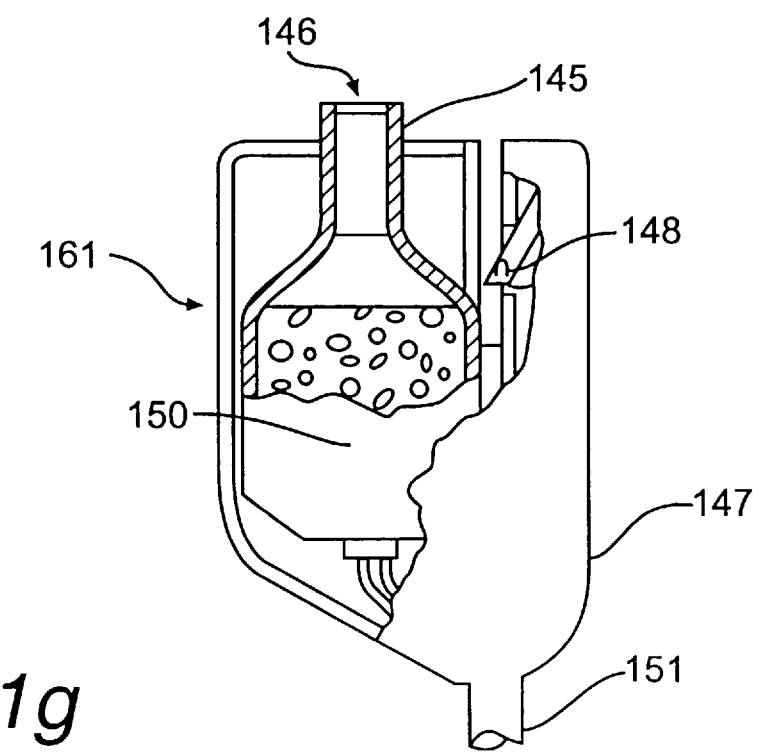
Figure 1H:
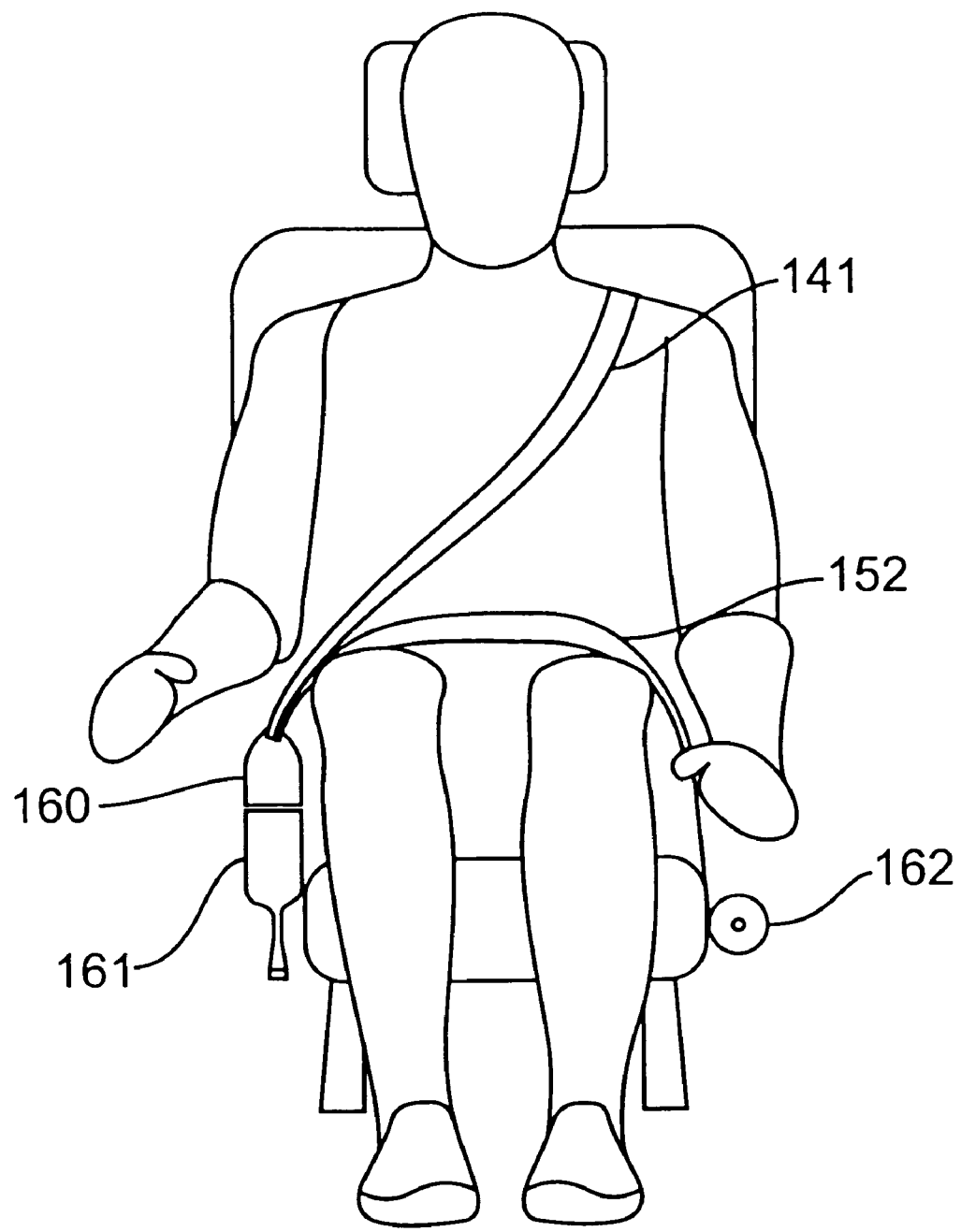
FIG. 1h is an overall schematic diagram showing how the latch and buckle assemblies of FIGS. 1f and 1g, respectively, are used with the torso and lap belts.
Figure 2C:
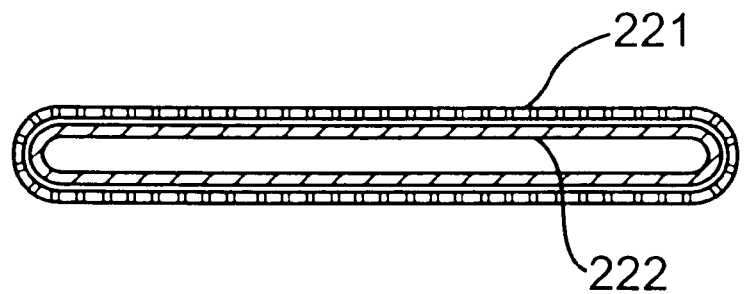
FIG. 2c is a schematic diagram of a braided tube having an inner bladder.
Figure 2D:
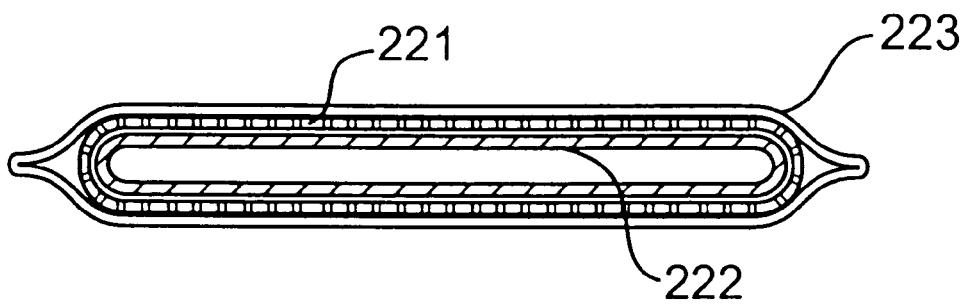
FIG. 2d is a schematic diagram of a braided tube having an inner bladder and a protective sheath.

FIGS. 1f and 1g are schematic diagrams of the latch assembly and the buckle assembly used with an alternative placement for the gas generator. The generator is placed in the buckle assembly of the torso belt. FIG. 1f is a schematic diagram of the latch assembly of the seat belt, showing lap belt 140, torso belt 141 (which contains the inflatable structure), fill hose 142 and female fill tube 143. A frangible seal 144 at the entrance to the fill tube protects the inflatable structure from contamination. The entrance to female fill tube 143 on the latch assembly in FIG. 1f mates with male fill tube 145 in the buckle assembly shown in FIG. 1g. Fill tube 145 is protected from contamination by frangible seal 146. If the gas generator is ignited, the pressure of the inflating gas bursts frangible seals 144 and 146, allowing gas to flow from gas generator 150 through the buckle and latch assembly to the inflatable structure in torso belt 141. Engaging the latch assembly with the buckle assembly seals fill tubes 143 and 145. Lock tang 149 (at the end of the latch assembly) engages lock dog 148 (in the buck assembly) in the same manner as conventional seat belt latch and buckle assemblies, so that the latch assembly locks to the buckle assembly. FIG. 1h is an overall schematic diagram of this embodiment showing torso belt 141, lap belt 152, latch assembly 160, buckle assembly 161 and lap belt retractor 162.

Braided tube 101 is shown in detail in FIGS. 2a–2d. Braided tube 101 is comprised of a braided tube of continuous high-strength fibers. Typical fiber materials include aramid, nylon, dacron, polyamide and polyester fibers. Braided tube 101 is made of continuous fibers that may or may not be impregnated with elastomeric material, such as silicone rubber or urethane. Unlike the conventional fibers employed in prior art for making air bags, the fibers of this invention form spirals and change their orientation (included longitudinal angles) upon inflation. Prior to inflation, the spirals are stretched-out longitudinally and the tubular restraint has a relatively small diameter. Subsequent to inflation, the spirals are closer together longitudinally and form a relatively large tubular diameter. That is, upon inflation, the entire braided tube increases its diameter and decreases its length, or contracts. This contraction occurs because as the tube is inflated, the fibers seek an orientation that allows a larger volume within the tube.

As shown in FIG. 2a, angle 201 is a longitudinal angle and angle 202 is a circumferential angle. In the uninflated state, shown in FIG. 2a, braided tube 101 is elongated with its woven fibers forming obtuse and acute angles at the fiber crossing points 111. For the sake of convenience and clarity, the angles which are acute in FIG. 2a (which would be bisected by a line parallel to the longitudinal axis of the braided tube) will be termed the longitudinal angles. The angles which are obtuse in FIG. 2a (which would be bisected by a line parallel to the circumference of the braided tube) will be termed the circumferential angles.

When the braided tube is in the uninflated state, its fibers are at a longitudinal angle in the range of about 30° to about 70°. In every case, upon inflation, the fibers will seek a preferred maximum longitudinal angle of about 110° when the tube is in an unconstrained state. Typically, the angle after inflation is approximately 100° in an unloaded, or unconstrained, braided tube. Given the range of angles from about 30° to about 70° in an uninflated tube and an angle of about 100° in an unloaded inflated tube, the range of typical length decrease, or contraction, of the inflatable tube is about 21.5% (for the 70° to 100° change) to about 33.5% (for the 30° to 100° change). The percentage of contraction is not a function of the initial diameter or length of the inflatable tube.

The calculation for determining the amount of contraction that will occur with the present invention upon inflation and in an unconstrained condition is as follows:

$$Lf-Li=X \quad (5)$$

where:

X is the amount of contraction

Lf is the length of flat, uninflated, material, and

Li is the length of unconstrained inflated material and $$Li/Lf=\cos(\theta i/2)/\cos(\theta f/2) \quad (6)$$

$$Lf-Li=Lf(1-\cos(\theta i/2)/\cos(\theta f/2)) \quad (7)$$

where:

θf is the longitudinal angle prior to inflation

θi is the longitudinal angle after inflation.

Merely by way of example, an embodiment of the present invention having an uninflatable flat length of 100 cm and a flat diameter of 20 cm and constructed with fibers that cross each other at a 36° angle would decrease in length, or contract, to 67 cm or by approximately 33% upon inflation in an unconstrained condition. (The calculation assumes that the angle of the fibers in an unconstrained inflated braided tube will be 100°.)

As stated above, the invention contracts as a result of both inflation and construction. Therefore, it will typically contract about 21.5% to about 33.5% as a result of the change in orientation of the fibers (construction) plus an additional percent (Lf−Li=Df(1−2/π)) as a result of the geometrical change from a flat belt to a cylindrical belt with hemispherical ends. Thus the braid contraction is in addition to—not instead of—the retraction in a conventional seat belt.

The fibers in the braided tube form clockwise and counterclockwise spirals both prior to inflation and subsequent to inflation. Prior to inflation, the spirals are stretched-out longitudinally, and have a relatively small diameter. Subsequent to inflation, the spirals are closer together longitudinally, and have a relatively large diameter. This occurs because, as the tube is inflated, the tube fibers seek an orientation that allows a larger volume within the tube, and results in lower resultant stress, with fibers aligned to roughly parallel to the orientation of the resultant stress.

FIG. 2b shows that as it inflates, braided tube 101 shortens in length, while its diameter increases. The braid fibers ultimately seek an orientation in which the longitudinal angles increase substantially as the tube diameter increases. As the tube diameter increases, the tube length decreases. If the tube were unconstrained and the longitudinal angles of the tube were in the range of about 30° to about 70°, the typical range for unconstrained decrease of the tube length is about 20% to about 39%, preferably about 21.5% to about 33.5%, and most preferably about 33.5%.

The fibers in the uninflated braided tube typically have a longitudinal angle in the range of about 30° to about 70°. Upon inflation the longitudinal angle between the fibers will reach approximately 100°. The preferred maximum longitudinal inflation angle of the fibers is approximately 110°.

FIG. 1a shows seat belt system 110 of the present invention in the uninflated state in which braided tube 101 assumes a flat woven belt configuration and the system acts as part of a conventional 3-point restraint. The uninflated braided tube in combination with the conventional webbing forms a high-strength belt that has the same width (approximately 2 inches) as the conventional webbing material of lap belt 102 and torso belt 103.

As best shown in FIG. 1d, when a collision occurs, the crash sensor sends a signal to the initiator in gas generator 122. The initiator then ignites the gas generator 122, thus producing a gas that passes through durable tubing 116 and inflates braided tube 101. As gas flows into the chamber of braided tube 101, the internal pressure causes the tube diameter to increase and the tube length to decrease. However, the seat belt system 110 is constrained on the outboard side by the first inertial reel 117 and on the inboard side by anchor 106, and behind the shoulder by the second (shoulder or torso belt) inertial reel 118. Inertial reels 117 and 118 lock up during impact, preventing payout of the belt. Thus as braided tube 101 contracts, it pulls any slack out of seat belt system 110. The occupant is thus provided with a pretensioned seat belt, which restricts the forward motion of the occupant and reduces primary injuries.

Further, the male portion of the buckle assembly 105 can be located on the lap belt 102 using rip-stitching or a locating snap or button. When a collision occurs and upon inflation, the locating attachment between lap belt 102 and buckle 105 releases, allowing the lap portion to pull tight, thereby further restricting the motion of the occupant and preventing the occupant from sliding under the lap belt (i.e., submarining).

Braided tube 101 is not stowed under any belt member, but is instead stowed on the outside of the torso belt. This positioning allows the tube to inflate evenly without experiencing roll-out problems. Seam splitting problems common to inflating bladders are also avoided because braided tube 101 is a seamless structure.

When fully inflated, braided tube 101 has a diameter of approximately 12 to 18 cm and a relative internal pressure of approximately 1 to 4 bars (2 to 5 bars absolute pressure). Due to increased friction, as the area of contact of inflated braided tube 101 with the occupant increases, inflated braided tube 101 helps to further restrict occupant motion. Unlike conventional 3-point seat belt systems, the present invention additionally helps lessen or prevent secondary belt-inflicted injuries by providing a substantially larger restraint surface area for the occupant's body, which helps to distribute belt load forces.

Additionally, the present invention provides side impact crash protection from head injury by restricting head movement, preventing the occupant's head from striking the window, the side of the vehicle, or any intruding objects.

Figures 1, 3A:
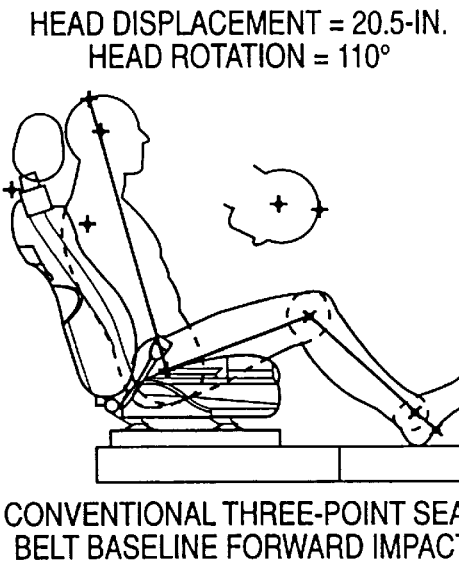
FIG. 3a is a schematic diagram showing the relative distance of the head displacement and the degree of head rotation during equivalent simulated forward-impact crash tests in which a conventional seat belt, a first air belt inflated to a relative pressure of 1 bar, a second air belt inflated to a relative pressure of 3 bars, and the present invention during the tests summarized in Table 1.
Figures 2, 3A:
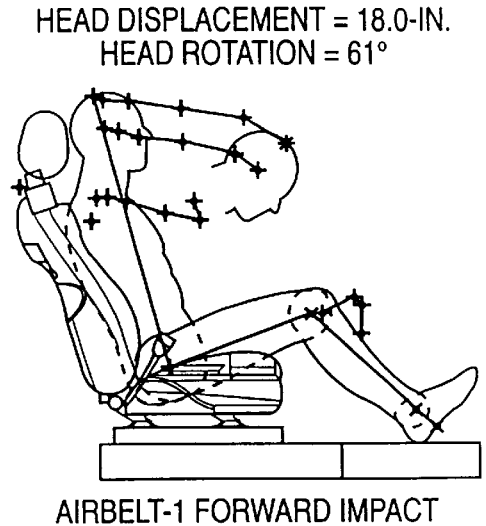
Figures 3, 3A:
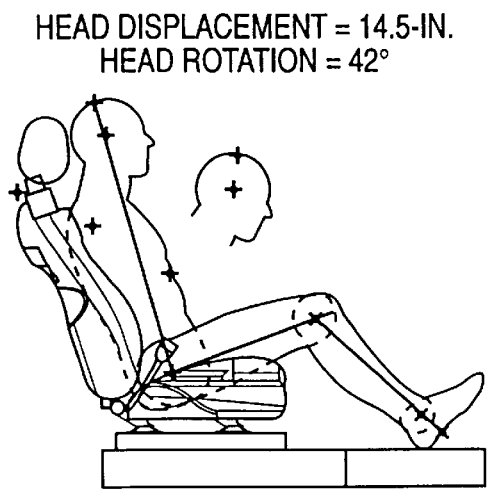
Figures 3, 3A, 4:
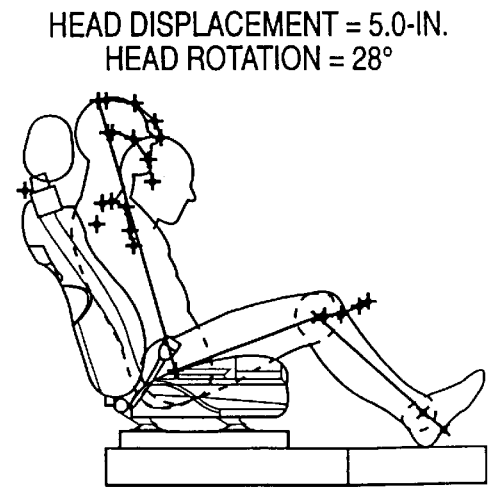
Figures 1, 3B:
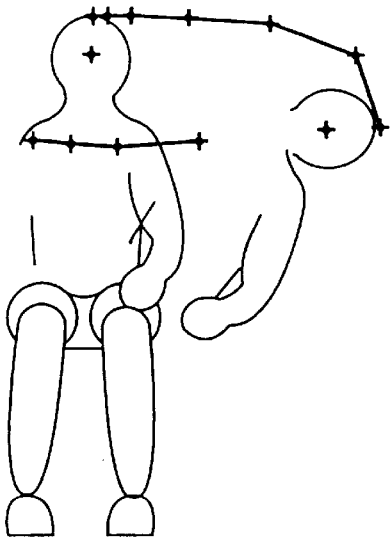
FIG. 3b is a schematic diagram showing the relative distance of the head displacement and the degree of head rotation during equivalent simulated side-impact crash tests in which a conventional seat belt, a first air belt inflated to a relative pressure of 1 bar, a second air belt inflated to a relative pressure of 3 bars, and the present invention during the tests summarized in Table 1.
Figures 2, 3B:
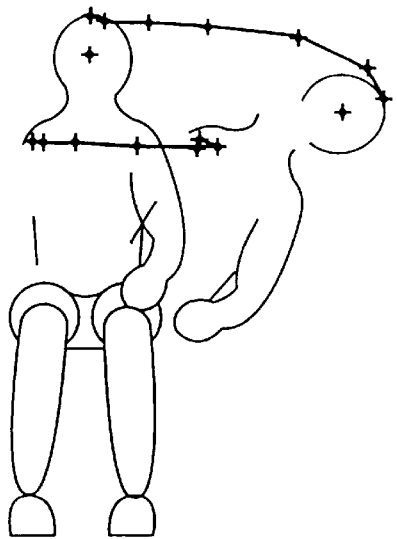
Figures 3, 3B:
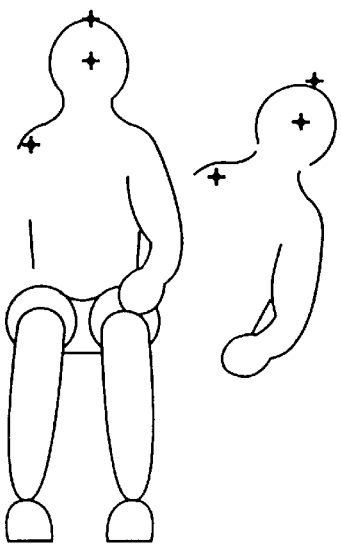
Figures 3, 3B, 4:
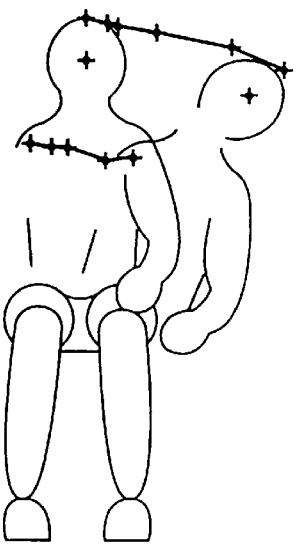

FIGS. 3a and 3b illustrate the results of simulated crash tests. These figures demonstrate that the present invention is more effective in limiting forward and side head displacement in frontal and side impacts, respectively, than are conventional prior art three-point seat belts and air belts fabricated from conventional materials.

The crash tests also demonstrated an important feature of the present invention: the belt continues to contract and further restrains the occupant after the initial loading. The sequence is as follows:

(1) An impact occurs, causing the vehicle to decelerate suddenly;

(2) The crash sensor detects the impact, and initiates inflation of the inflatable portion of the torso belt;

(3) The occupant continues to move forward (relative to the vehicle) against the torso belt;

(4) The inflatable portion of the torso belt inflates, pretensioning the torso belt, distributing the stresses over a wider area, and preventing the occupant from hitting the windshield;

(5) The occupant reaches his/her maximum forward position—at this point, the occupant is exerting considerable force on the torso belt, which puts the torso belt under an additional tensile force, which in turn prevents the inflatable portion of the torso belt from reaching its maximum contraction;

(6) The occupant then rebounds back towards the seat back, relieving the additional tensile force from the torso belt, allowing the inflatable portion to contract further in length while its diameter expands, effectively performing a second pretensioning function;

(7) The additional contraction in length keeps the occupant firmly in the seat during secondary collisions or rollovers, and prevents the occupant from sustaining further injuries.

Thus the present invention functions quite differently from other restraint systems, because (unlike a conventional belt pretensioner) the torso belt continually tries to contract after the initial loading (of the occupant on the restraint system).

Figure 4A:
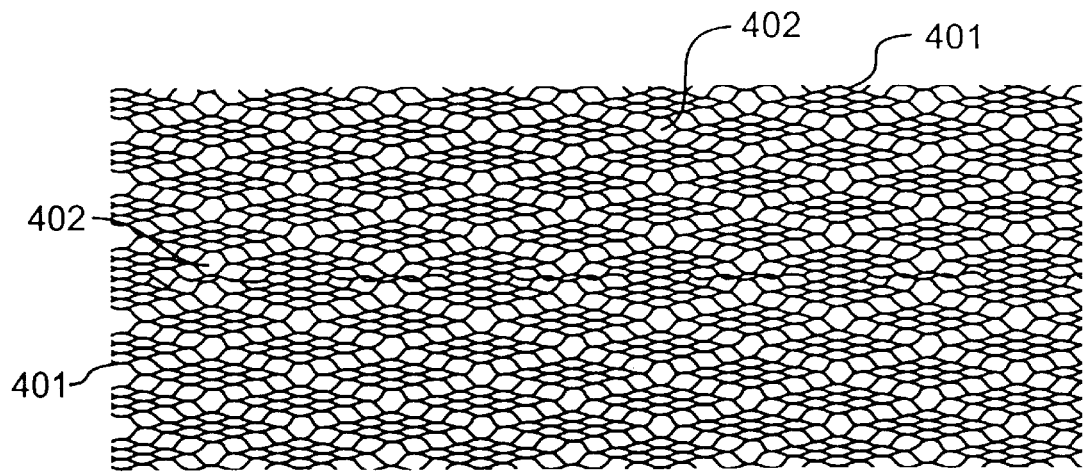
FIG. 4a is a schematic diagram of an extruded net tubular structure, prior to inflation.
Figure 4B:
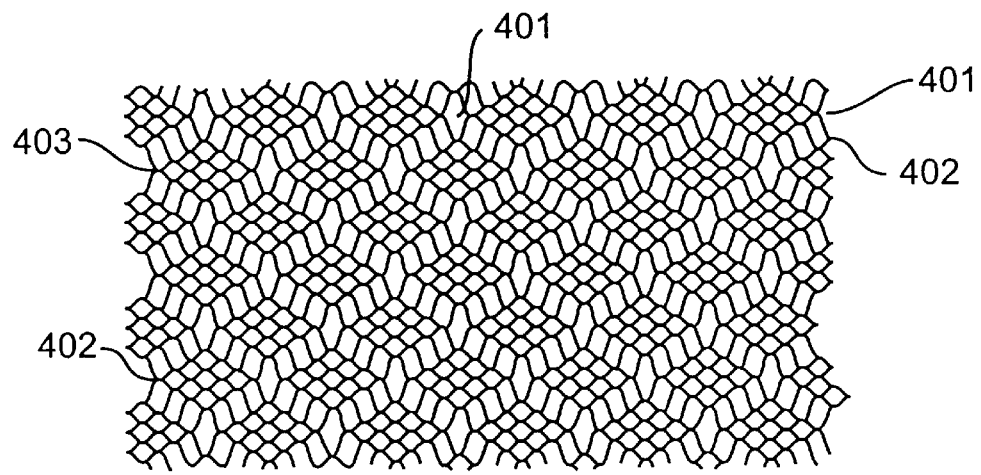
FIG. 4b is a schematic diagram of an extruded net tubular structure, after inflation.

In the second preferred embodiment of the present invention, an extruded net formed in a tubular shape is used as the inflatable structure (instead of the braided tube). FIGS. 4a and 4b show the extruded net, prior to inflation (FIG. 4a) and subsequent to inflation (FIG. 4b). FIGS. 4a and 4b show how the extruded net contracts in length as it is inflated and expands in diameter. FIGS. 4a and 4b also show that the intersecting members 401 form flexible joints 402 at the intersections of the members, which deform as the tube is inflated and expands. The longitudinal angle of intersection 403 of the fibers increases dramatically, as shown in FIG. 4b which, just as in the braided tube, causes the tube to contract substantially in length as its diameter increases. Materials that could be used to fabricate the extruded net include nylon and polyester.

Figure 5A:
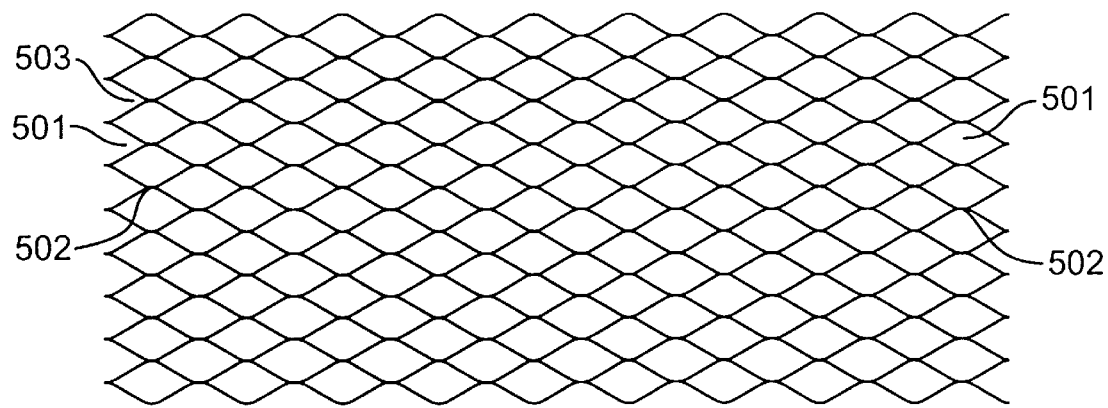
FIG. 5a is a schematic diagram of a modified extruded net tubular structure, prior to inflation.
Figure 5B:
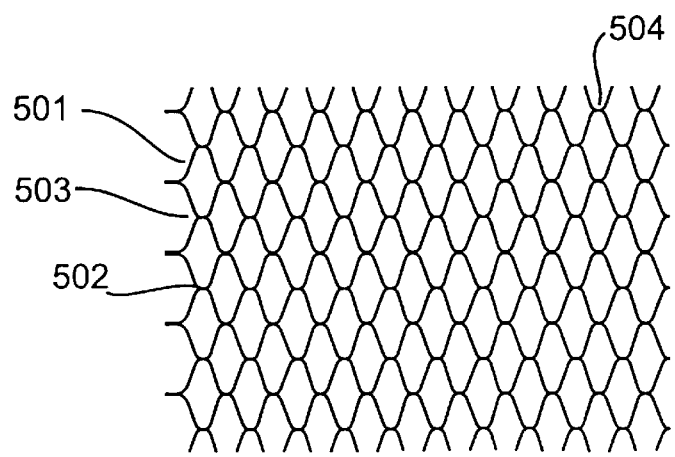
FIG. 5b is a schematic diagram of a modified extruded net tubular structure, after inflation.

An alternative second preferred embodiment of the present invention uses a modified extruded net, in which the intersections of the fibers are strengthened with nodes, as shown in FIGS. 5a and 5b. Like the extruded net shown in FIGS. 4a and 4b, this embodiment uses members 501 which are joined at intersections 502. When the tube is inflated, the longitudinal angle 503 of the intersecting members increases dramatically. Unlike the extruded net of FIGS. 4a and 4b, the intersections 502 include nodes 504 which serve to strengthen the net. Typical materials that could be used to fabricate the modified extruded net include nylon and polyester fibers. Extruded Net can be obtained from Pacon, Inc., City of Baldwin Park, Calif. 91706, or from Polynet, Inc., P.O. Box 27, Three Rivers, Mass. 01080.

Figure 6A:
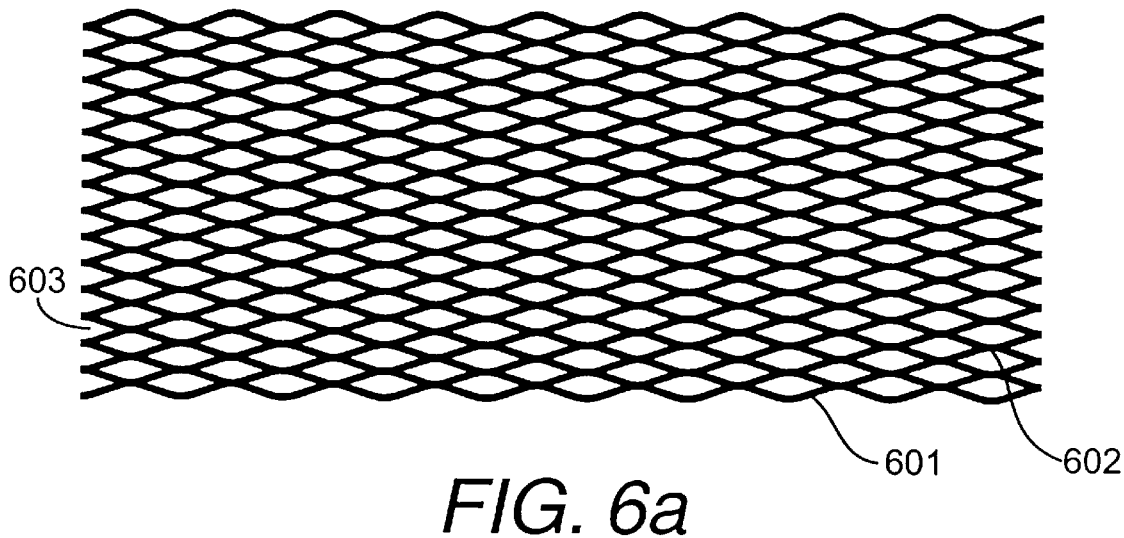
FIG. 6a is a schematic diagram of a woven net tubular structure, prior to inflation.
Figure 6B:
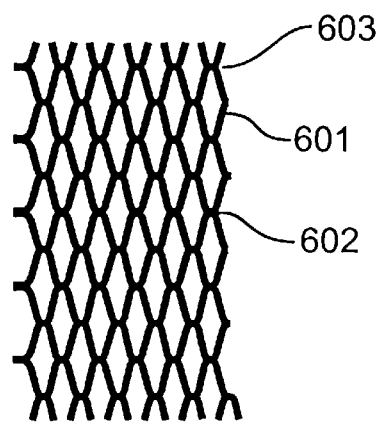
FIG. 6b is a schematic diagram of a woven net tubular structure, after inflation.

A third preferred embodiment used a woven net, as shown in FIGS. 6a and 6b. FIGS. 6a and 6b show fibers 601 woven in a net comprising intersections 602. The woven net is similar to the extruded net, but the joints are woven together instead of being joined together. As the tube is expanded, the joints are reoriented and the longitudinal angle 603 increases, as shown in FIG. 6b. Typical materials that could be used to fabricate the woven net include nylon, polyester and aramid fibers.

The gas generator 122 used in the invention is preferably similar to those currently used in automotive side-impact as opposed to frontal air bags. This is due to the relatively smaller volume and faster filling requirements of side-impact air bags as opposed to frontal air bags. Gas generators preferred for this invention must inflate braided tube 101 to a relative pressure of approximately 1.5 bars (2.5 bars absolute) within 10 to 15 milliseconds.

The present invention could be installed for the protection of passengers sitting in the rear seat of an automobile using the same installation as for front seat occupants (e.g., a driver and a passenger), i.e., by routing the inflatable portion of the torso section over the top of the back of the seat. However, the inflatable portion could also be routed through a constraint at the top of the back of the rear seat, over the rear shelf of the vehicle, and into the trunk, as shown in FIGS. 7a–7b, 8a–8c and 9. The retractor winds up the belt when no one is using the restraint system, and pays out the torso belt to accommodate an occupant. The retractor uses an inertial reel, i.e., a reel that locks up in the event of a frontal impact. In the embodiment shown in FIGS. 7a–7b, the inflatable section of the torso belt is connected to a hose, which in turn is attached to a rigid pipe. The rigid pipe is rotatably attached to the gas generator, such that when the gas generator is ignited and generates inflating gas, the inflating gas goes into the rigid pipe, through the hose and into the inflatable section of the torso belt, inflating the inflatable section of the torso belt.

Figure 7A:
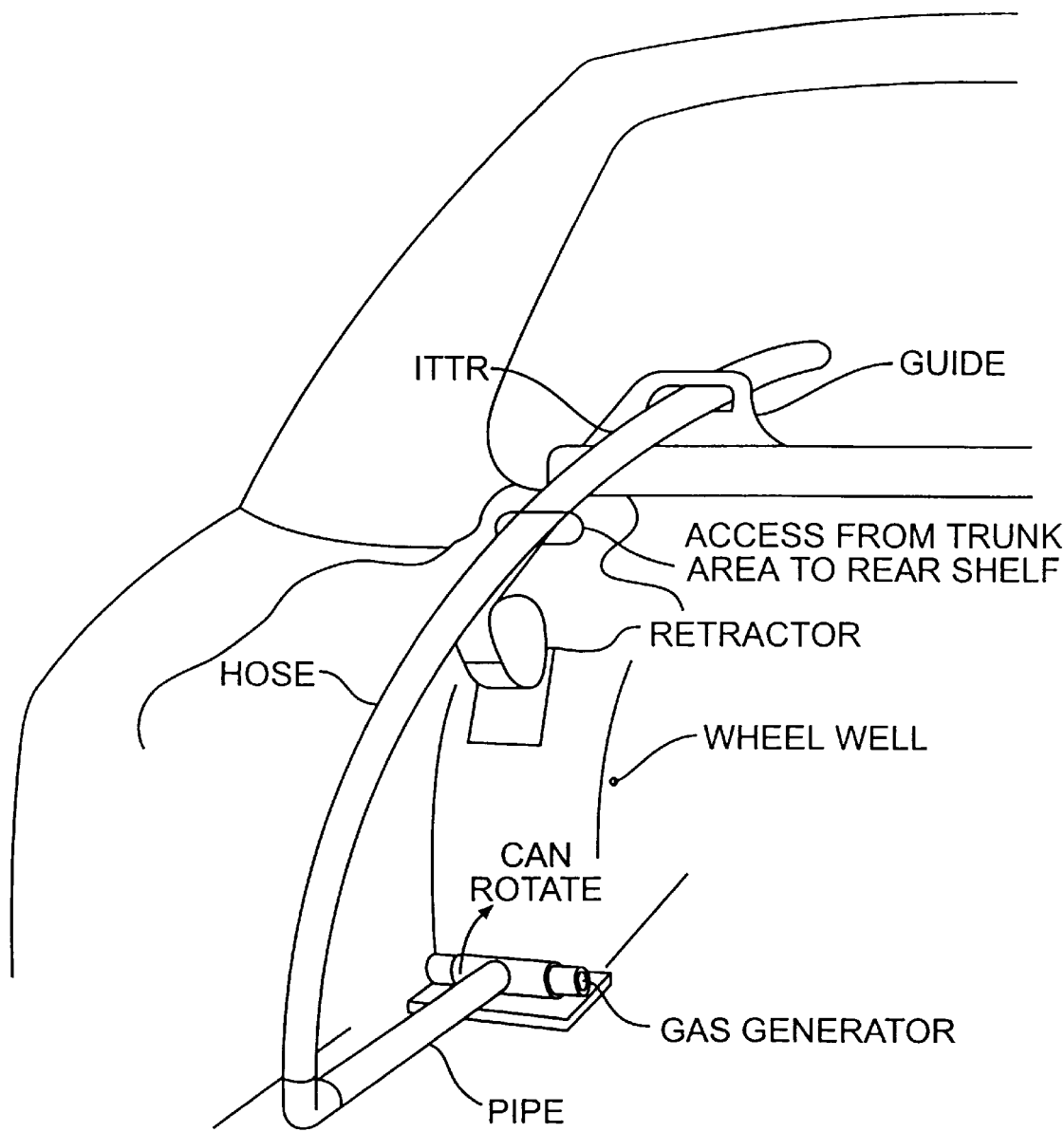
FIGS. 7a–7b are a schematic diagrams of a rear seat installation of the present invention (using a rigid pipe), when the passenger is sitting back in the seat (FIG. 7a) and when the passenger is leaning forward (FIG. 7b).
Figure 7B:
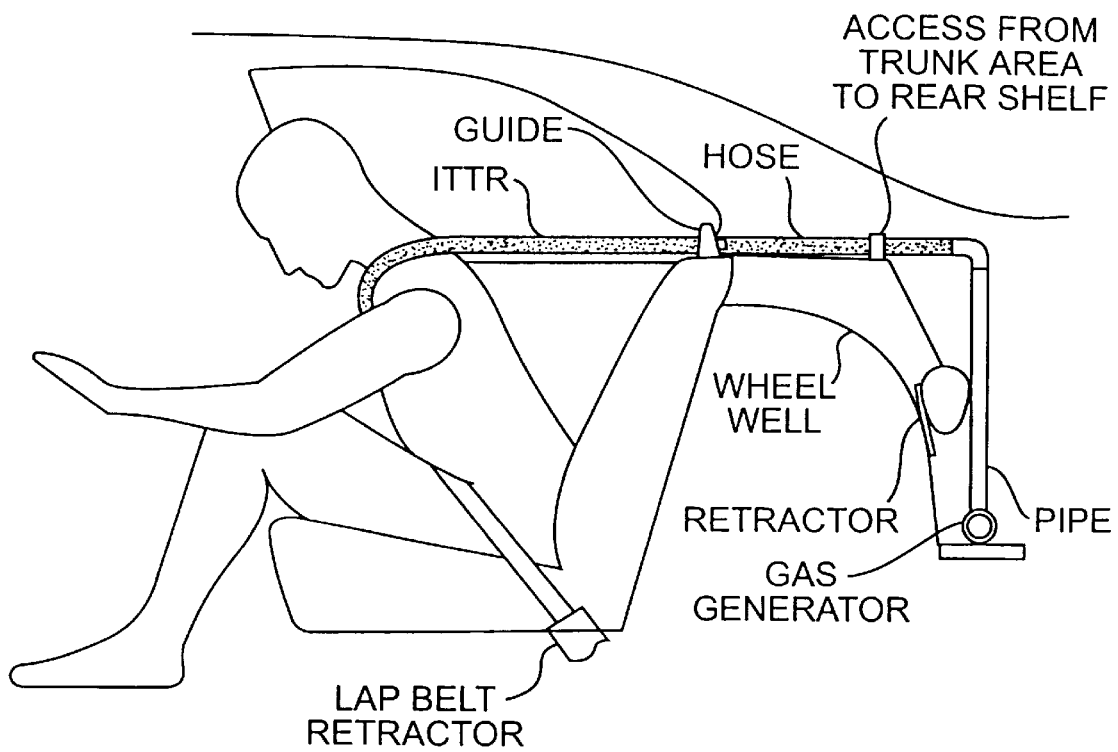
Figure 8A:
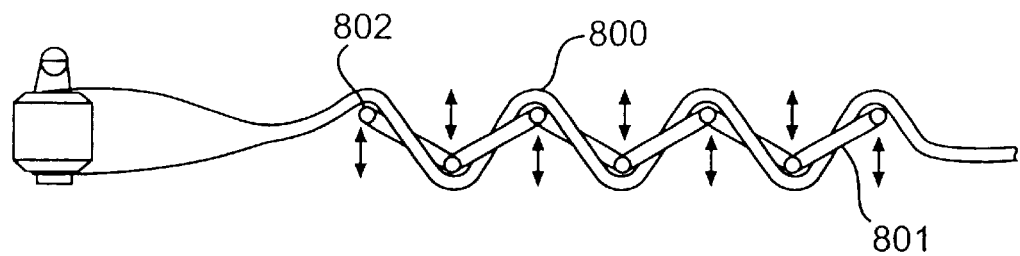
FIGS. 8a–8c are schematic diagrams of a rear seat installation of the present invention using torsion springs to maintain tension on the inflatable structure.
Figure 8B:
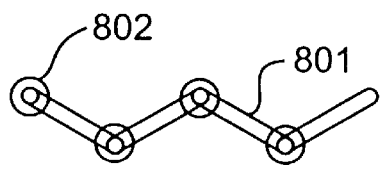
Figure 8C:
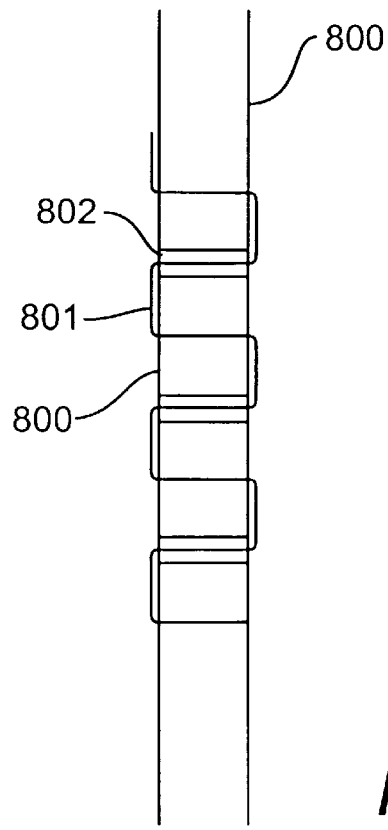

FIGS. 8a–8c illustrate an alternative to the embodiment shown in FIGS. 7a–7b. The embodiment of FIGS. 8a–8c uses a flexible hose, and a flexible retractor to maintain tension of the inflatable structure. The flexible retractor includes torsion springs 801 and rollers 802 to hold flexible hose 800 under tension.

Figure 9:
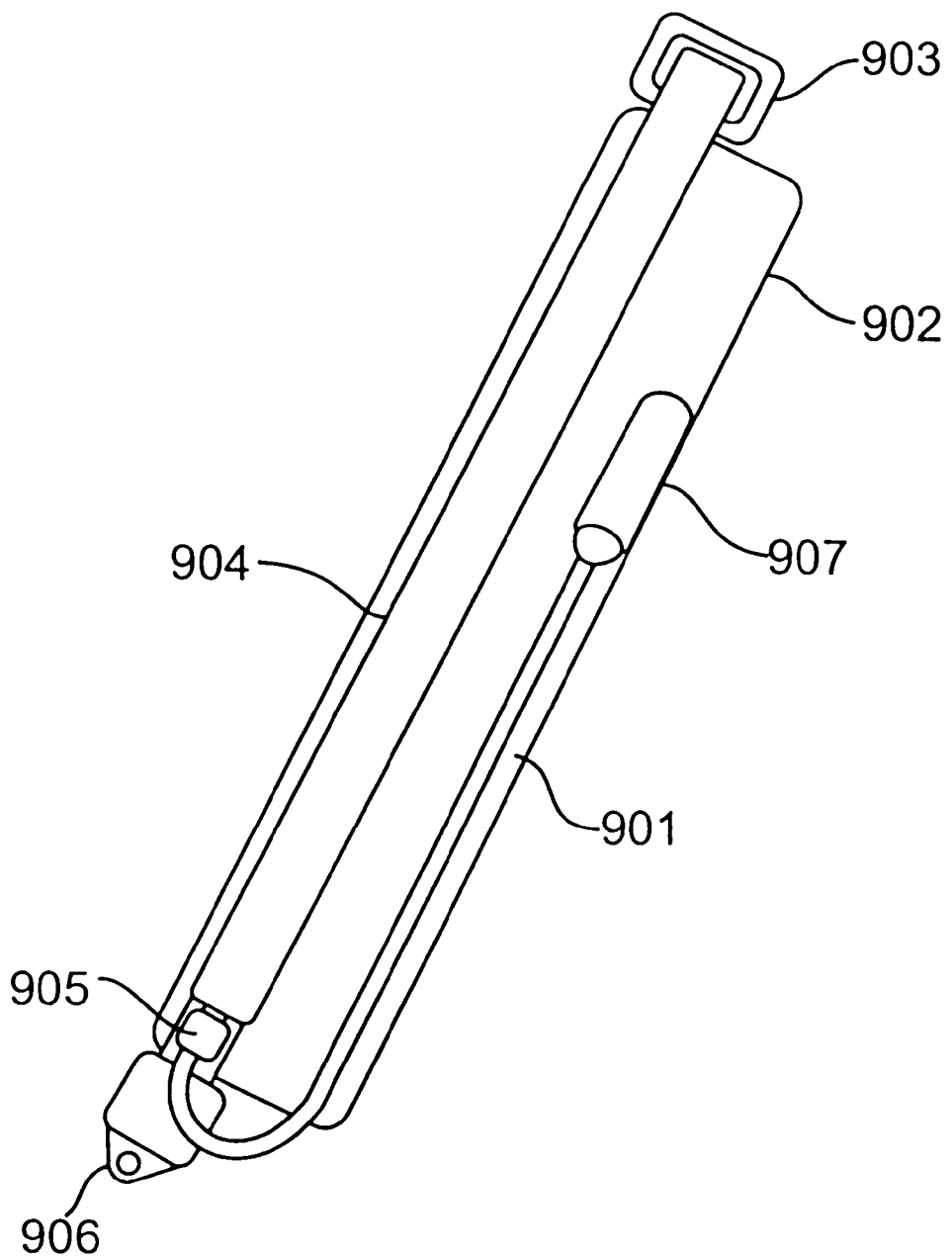
FIG. 9 is a schematic diagram of a rear seat installation of the present invention, that uses flexible tubing and a channel guide to maintain tension and to provide for variation in occupant size.

FIG. 9 is a schematic diagram of another embodiment of the present invention for rear seat installation similar to that of FIGS. 1a–1e. In this embodiment, fill hose 901 is held in a low-friction channel 902. Fill hose 901 is connected at one end to gas generator 907 and at its opposite end to inflatable structure 904 via connector 905. Fill hose 901 is bent into a U shape or J shape, as shown in FIG. 9, and held in place by channel 902. Retractor 906 reels in or pays out the belt as the occupant sits back or moves forward in her seat. FIG. 9 shows the position of the hose and inflatable structure when the occupant is sitting back in her seat. When the occupant is in a forward position, the "J" shape shown in FIG. 9 becomes much greater (and looks more like a "U") as the end of inflatable structure 904 and connector 905 move up the channel to accommodate the forward position of the occupant. The hose material itself (e.g., nylon) is resilient such that the "J" or "U" shape is maintained as the belt is payed out or reeled in. FIG. 9 also shows D-ring 903 that positions the inflatable structure over the shoulder of the occupant. Graphite powder or other lubricants may be used, if necessary to minimize friction between the hose and the channel.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What we claim is:

1. A seat restraint system in a vehicle comprising:
   (a) a torso belt comprising an inflatable structure that contracts substantially in length and increases substantially in cross-sectional area when it is fully inflated, wherein the inflatable structure assumes a flat configuration prior to inflation;
   (b) a gas generator fluidly connected to the inflatable structure;
   (c) a crash sensor electrically connected to the gas generator, said crash sensor initiating generation of gas by the gas generator when an impact is detected such that the inflatable structure is fully inflated; and
   (d) a constraint mounted on the top of a vehicle seat, wherein the inflatable structure is routed through the constraint such that portions of the inflatable structure on both sides of the constraint are inflatable, and such that the inflated portion of the torso belt lying over the top of the vehicle seat would push an occupant of the seat down into the seat, thus controlling the position of the occupant during a collision.

2. The seat restraint system of claim 1, wherein the seat is the rear seat of a passenger vehicle, and wherein the inflatable structure extends across a rear shelf of the vehicle towards the vehicle's trunk.

3. The seat restraint system of claim 2, wherein the gas generator is installed in the vehicle's trunk.

4. The seat restraint system of claim 3, wherein the inflatable structure is fluidly connected to a rigid pipe which in turn is fluidly connected to the gas generator, and wherein the system is configured such that the rigid pipe would rotate up when an occupant leans forward and would rotate back when the occupant sits back in the rear seat.

5. The seat restraint system of claim 3, wherein the inflatable structure is fluidly connected to a hose in a hose retractor, and wherein the hose is in turn fluidly connected to the gas generator.

6. The seat restraint system of claim 3, further comprising a hose between the inflatable structure and the gas generator, wherein said hose is fluidly connected to the gas generator on one end and fluidly connected to the inflatable structure at its other end, further comprising a low-friction channel constraining the hose within the channel.

7. The seat restraint system of claim 6, wherein the hose has a gas generator end, and wherein the gas generator end of the hose is attached to a belt, further comprising a retractor configured to pay out the belt when an occupant leans forward and to reel in the belt when the occupant sits back.

8. The seat restraint system of claim 1, wherein the inflatable structure is a braided tube.

9. The seat restraint system of claim 1, wherein the inflatable structure is an extruded net.

10. The seat restraint system of claim 9, wherein the extruded net comprises intersecting fibers joined at intersections forming longitudinal angles which increase from 5°–15° prior to inflation, to 90°–150° after inflation, when the inflatable structure is fully inflated without tension.

11. The seat restraint system of claim 10, wherein the longitudinal angles increase to 90°–110° after inflation.

12. The seat restraint system of claim 1, wherein the inflatable structure is a woven net.

13. The seat restraint system of claim 1, wherein the inflatable structure further comprises a protective sheath.

14. The seat restraint system of claim 1, further comprising a lap belt, wherein the lap belt and the torso belt form one continuous strap.

15. The seat restraint system of claim 14, wherein the continuous strap passes through a first component of a buckle assembly, further comprising a buckle strap attached to a second component of the buckle assembly, said buckle strap being pivotally mounted to the vehicle.

16. The seat restraint system of claim 15, wherein the gas generator is mounted in the buckle assembly.

17. The seat restraint system of claim 1, wherein the gas generator is mounted inside the seat back.

18. A seat restraint system comprising:
   (a) a belt comprising a torso belt portion and a lap belt portion, said torso belt portion comprising an inflatable structure that contracts substantially in length and increases substantially in cross-sectional area when it is fully inflated, wherein the inflatable structure assumes a flat configuration prior to inflation;
   (b) a gas generator fluidly connected to the inflatable structure;
   (c) a crash sensor electrically connected to the gas generator, said crash sensor initiating generation of gas by the gas generator when an impact is detected such that the inflatable structure is fully inflated;
   (d) a constraint mounted on the top of a vehicle seat located in the rear of the vehicle, wherein the inflatable structure is routed through the constraint such that portions of the inflatable structure on both sides of the constraint are inflatable, and such that the inflated portion of the torso belt lying over the top of the vehicle seat would push an occupant of the seat down into the seat, thus controlling the position of the occupant during a collision, and wherein the inflatable structure extends across the rear shelf of the vehicle into the trunk of the vehicle;

(e) a buckle assembly, said belt passing through a first component of the buckle assembly; and (f) a buckle strap connected to a second component of the buckle assembly, said buckle strap being pivotally attached to the vehicle, wherein the lap belt portion of the lap belt is connected to an inertial reel anchored to the vehicle.

19. The seat restraint system of claim 18, wherein the inflatable structure is fluidly connected to a rigid pipe which in turn is fluidly connected to the gas generator, and wherein the system is configured such that the rigid pipe would rotate up when an occupant leans forward and would rotate back when the occupant sits back in the rear seat.

20. The seat restraint system of claim 18, wherein the inflatable structure is fluidly connected to a hose in a hose retractor, and wherein the hose is in turn fluidly connected to the gas generator.

21. The seat restraint system of claim 18, further comprising a hose fluidly connected at one end to the inflatable structure and its other end to the gas generator, further comprising a low-friction channel constraining the hose within the channel.

22. The seat restraint system of claim 21, wherein the hose has a gas generator end, and wherein the gas generator end of the hose is attached to a belt, further comprising a retractor configured to pay out the belt when an occupant leans forward and to reel in the belt when the occupant sits back.

23. The seat restraint system of claim 18, wherein the inflatable structure is a braided tube.

24. The seat restraint system of claim 18, wherein the inflatable structure is an extruded net.

25. The seat restraint system of claim 24, wherein the extruded net comprises intersecting fibers joined at intersections forming longitudinal angles which increase from 5°–15° prior to inflation, to 90°–150° after inflation, when the inflatable structure is fully inflated without tension.

26. The seat restraint system of claim 25, wherein the longitudinal angles increase to 90°–110° after inflation.

27. The seat restraint system of claim 18, wherein the inflatable structure is a woven net.

28. The seat restraint system of claim 18, wherein the inflatable structure is a braided tube within a protective sheath.

29. A seat restraint system in a vehicle comprising:

(a) a belt having a lap belt portion, and a torso belt portion, wherein the lap belt portion is attached to a first inertial reel pivotally attached to the vehicle, and wherein the belt is attached to a first portion of a buckle assembly at the end of the lap portion of the belt and at the beginning of the torso belt portion of the belt;

(b) an inflatable tubular structure comprising part of the torso belt, said inflatable tubular structure being routed through a constraint on the top of a vehicle seat located in the rear of the vehicle towards the trunk of the vehicle;

(c) a gas generator fluidly connected to the inflatable tubular structure;

(d) a strap attached at one end to a second portion of the buckle assembly, and anchored to the vehicle at the other end, wherein the inflatable tubular structure increases its cross-sectional area by at least 50% and reduces its length by at least about 20%, when it is fully inflated in an unconstrained state, and wherein the inflatable structure is routed through the constraint such that portions of the inflatable structure on both sides of the constraint are inflatable, and such that the inflated portion of the torso belt lying over the top of the vehicle seat would push an occupant of the seat down into the seat, thus controlling the position of the occupant during a collision, and wherein the inflatable tubular structure is not vented after inflation, such that it reduces the extent and severity of secondary injuries as well as reducing the extent and severity of primary injuries.

30. The seat restraint system of claim 29, wherein the inflatable structure is fluidly connected to a rigid pipe which in turn is fluidly connected to the gas generator, and wherein the system is configured such that the rigid pipe would rotate up when an occupant leans forward and would rotate back when the occupant sits back in the rear seat.

31. The seat restraint system of claim 29, wherein the inflatable structure is fluidly connected to a hose in a hose retractor, and wherein the hose is in turn fluidly connected to the gas generator.

32. The seat restraint system of claim 29, further comprising a hose fluidly connected at one end to the inflatable structure and its other end to the gas generator, further comprising a low-friction channel constraining the hose within the channel.

33. The seat restraint system of claim 32, wherein the hose has a gas generator end, and wherein the gas generator end of the hose is attached to a belt, further comprising a retractor configured to pay out the belt when an occupant leans forward and to reel in the belt when the occupant sits back.

34. The seat restraint system of claim 29, wherein the inflatable structure is a braided tube.

35. The seat restraint system of claim 29, wherein the inflatable structure is an extruded net.

36. The seat restraint system of claim 35, wherein the extruded net comprises intersecting fibers joined at intersections forming longitudinal angles which increase from 5°–15° prior to inflation, to 90°–150° after inflation, when the inflatable structure is fully inflated without tension.

37. The seat restraint system of claim 36, wherein the longitudinal angles increase to 90°–110° after inflation.

38. The seat restraint system of claim 29, wherein the inflatable structure is a woven net.

39. The seat restraint system of claim 38, further comprising a protective sheath enclosing the inflatable structure.

40. A seat restraint system for a vehicle comprising:

(a) a belt having a lap belt portion, and a torso belt portion, wherein the lap belt portion is attached to a first inertial reel having means for pivotally attaching the first inertial reel to the vehicle, and wherein the belt is attached to a first portion of a buckle assembly at the end of the lap portion of the belt and at the beginning of the torso belt portion of the belt;

(b) an inflatable tubular structure comprising part of the torso belt, said inflatable tubular structure routed through a constraint mounted on the top of a rear seat of the vehicle;

(c) a gas generator fluidly connected to the inflatable tubular structure;

(d) a strap attached at one end to a second portion of the buckle assembly;

wherein the inflatable tubular structure increases its cross-sectional area by at least 50% and reduces its length by at least about 20%, when it is fully inflated in an unconstrained state, and wherein the inflatable structure is routed through the constraint such that portions of the inflatable structure on both sides of the constraint are inflatable, and such that the inflated portion of the torso belt would push an occupant of a vehicle seat down into the seat, thus controlling the position of the occupant during a collision, and wherein the inflatable tubular structure is not vented after inflation, such that it reduces the extent and severity of secondary injuries as well as reducing the extent and severity of primary injuries.

41. The system of claim 40, wherein the inflatable structure is a braided tube.

42. The system of claim 40, wherein the inflatable structure is an extruded net.

43. The system of claim 40, wherein the inflatable structure is a woven net.

44. The system of claim 40, further comprising a hose fluidly connected at one end to the inflatable structure and at its other end to the gas generator.

45. The system of claim 44, wherein the hose is held within a hose retractor.

46. The system of claim 44, wherein the hose is fluidly connected to the gas generator through a rigid pipe.

47. The system of claim 44, further comprising means for rotating the rigid pipe as an occupant of the vehicle move forward and back.

48. The system of claim 44, further comprising a low-friction channel, wherein the hose is constrained within the channel.

49. The system of claim 40, wherein the buckle assembly comprises a gas generator.

* * * * *